(12) United States Patent
Rouvellou

(10) Patent No.: US 6,831,958 B1
(45) Date of Patent: Dec. 14, 2004

(54) TIMING RECOVERY DEVICE USING A FIXED EQUALIZER

(75) Inventor: Laurent Rouvellou, Paris (FR)

(73) Assignee: Koninklijke Philips N.V., Eindhoven (NL)

(*) Notice: Subject to any disclaimer, the term of this patent is extended or adjusted under 35 U.S.C. 154(b) by 804 days.

(21) Appl. No.: 09/667,985

(22) Filed: Sep. 22, 2000

(30) Foreign Application Priority Data

Sep. 28, 1999 (FR) .......................................... 99 12065

(51) Int. Cl.$^7$ ................................................ H04B 1/10
(52) U.S. Cl. ........................ 375/350; 375/354; 375/355
(58) Field of Search ................................ 375/233, 354, 375/229, 232, 321, 358, 230, 231, 350, 355, 316; 324/647

(56) References Cited

U.S. PATENT DOCUMENTS

| | | | | |
|---|---|---|---|---|
| 4,633,482 A | * | 12/1986 | Sari ........................... | 375/232 |
| 5,163,066 A | * | 11/1992 | Cupo et al. .................. | 375/232 |
| 5,353,312 A | * | 10/1994 | Cupo et al. .................. | 375/354 |
| 5,602,484 A | * | 2/1997 | Suzuki et al. ................ | 324/647 |
| 5,708,703 A | * | 1/1998 | Nagaraj ...................... | 379/340 |
| 5,872,815 A | * | 2/1999 | Strolle et al. ................ | 375/321 |
| 6,307,884 B1 | * | 10/2001 | Du et al. ..................... | 375/233 |
| 6,337,878 B1 | * | 1/2002 | Endres et al. ................ | 375/229 |
| 6,668,014 B1 | * | 12/2003 | Endres et al. ................ | 375/232 |

OTHER PUBLICATIONS

Shiue et al. QAM/VSB Dual Mode Equalizer Design and Implementation, The First IEEE Asia Pacific Conference on, Aug. 23–25, 1999, pp.:323–326.*

* cited by examiner

*Primary Examiner*—Don N. Vo
(74) *Attorney, Agent, or Firm*—Peter Zawilski

(57) ABSTRACT

The present invention relates to a receiving system (R) including an adaptive first equalizer (E1) associated with a first threshold detector (S1), and a device (TR) which enables the timing (TR) of a transmitting system to be recovered for said receiving system (R) from an equalized signal ($y_n$) and a signal obtained by thresholding ($s_n$).

The receiving system (R) also includes a fixed second equalizer (E2) associated with a second threshold detector (S2).

The receiving system finally includes a device (SW) by means of which it is possible to switch between a first mode of operation (position 1) in which the equalized signal ($y_n$) and the signal ($s_n$) obtained by thresholding are supplied by the second equalizer (E2) and the second threshold detector (S2), respectively, and a second mode of operation (position 2) in which the said signals ($y_n$ and $s_n$) are supplied by the first equalizer (E1) and the first threshold detector (S1), respectively.

Such a receiving system (R) provides independent operation of the adaptive equalizer (E1) and of the timing recovery device (TR), which speeds up the convergence of the clock of the receiving system with respect to that of transmitting system.

9 Claims, 2 Drawing Sheets

TIMING RECOVERY DEVICE USING A FIXED EQUALIZER

The present invention relates to a receiving system including a first equalizer associated with a first threshold detector and a device which enables the timing of a transmitting system to be recovered for said receiving system from an equalized signal and a signal obtained by thresholding.

Such a system can be included in any digital communication system, such as, amongst other possible applications, a modem, a set-top box or a television set.

The French Patent Application FR 93 10866 describes such a receiving system. The timing recovery device comprises a second-order phase-locked loop whose input is a function which depends on the shift between the clocks of the transmitting and receiving systems. The output of this loop is applied to a control device which determines the lead or lag to be applied to the clock of the receiving system.

The prior-art receiving system has some drawbacks.

Figure 1:
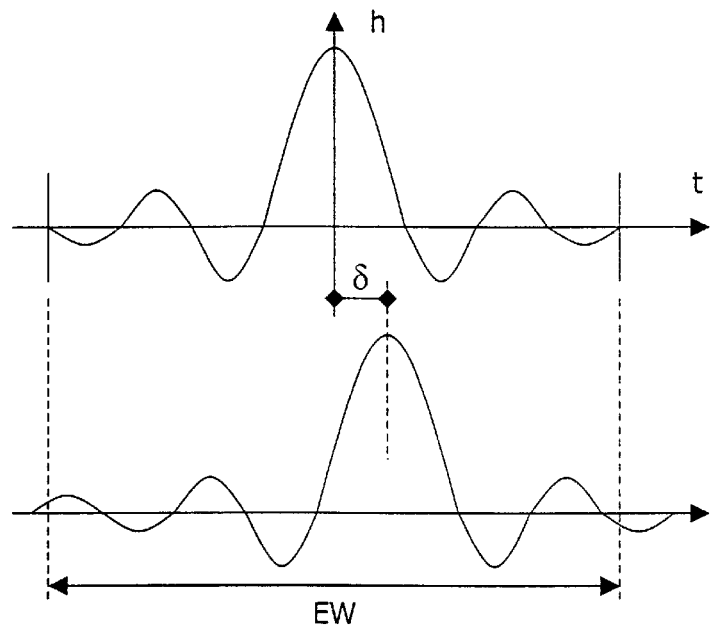

First of all, the simultaneous operation of the adaptive equalizer and of the timing recovery device forms a source of instability for the receiving system. As a matter of fact, these two devices interfere with one another, particularly during the initialization phase of the communication. During this period the timing has not yet been recovered and the adaptation of the equalizer then depends notably on the error as a result of the shift between the clocks of the transmitting and receiving systems. As is shown in FIG. 1, this results in a shift (δ) of the impulse response (h(t)) of the equalizer filter, which in the present case is modeled in accordance with a Nyquist function having a major lobe and minor lobes, in order to compensate for this error. Since the impulse response of the filter has a limited length, its length being defined by an equalization window, it is off-centered in the equalization window, which amounts to said window being shortened. Thus, the channel is equalized poorly and the convergence of the timing recovery device is slowed down.

Moreover, the operations performed by the adaptive equalizer and by the timing recovery device require a substantial amount of calculation time, particularly during the data transmission phase.

It is an object of the invention to eliminate these drawbacks to a substantial extent by providing a stable receiving system including an effective equalizer in conjunction with a timing recovery device which ensures a rapid convergence of the receiving system clock with respect to that of the transmitting system, the receiving system also enabling calculation time to be saved during the data transmission phase.

To this end, the invention proposes a receiving system which is characterized in that said receiving system also includes a second equalizer, which is a fixed equalizer associated with a second threshold detector and a device by means of which it is possible to switch between a first mode of operation in which the equalized signal and the signal obtained by thresholding are to be supplied by the second equalizer and the second threshold detector, respectively, and a second mode of operation in which the said signals are to be supplied by the first equalizer and the first threshold detector, respectively.

Such as receiving system makes it possible to achieve that the first equalizer, i.e. the adaptive equalizer, and the timing recovery device operate independently during a first mode of operation which corresponds to the communication initialization phase. During this period the timing recovery device operates with a second equalizer which comprises a filter whose coefficients are fixed and which consequently no longer interferes with this device, thereby giving the receiving system a higher stability and enabling a more rapid convergence of the clock of the receiving system to be achieved with respect to that of the transmitting system.

The invention also proposes a receiving system which is characterized in that the first equalizer is adapted to transfer, at appropriate time intervals, coefficients of an adaptive filter to the second equalizer, the said coefficients being calculated from an equalization error equal to a difference between the signals obtained from the first equalizer and the first threshold detector.

Thus, the coefficients of the filter associated with the fixed equalizer are refreshed at regular intervals, resulting in a further improvement of the convergence of the clock of the receiving system with respect to that of the transmitting system.

The invention also proposes a receiving system which is characterized in that it comprises a means which enables the timing recovery device and the first equalizer to operate alternately during the second mode of operation.

Thus, in the second mode of operation, which corresponds to the data transmission phase, the timing recovery device and the first equalizer operate in turns, which allows a 50% saving on the calculation time to be achieved.

Finally, such a receiving system can be included advantageously in any digital communication system.

Figure 2:
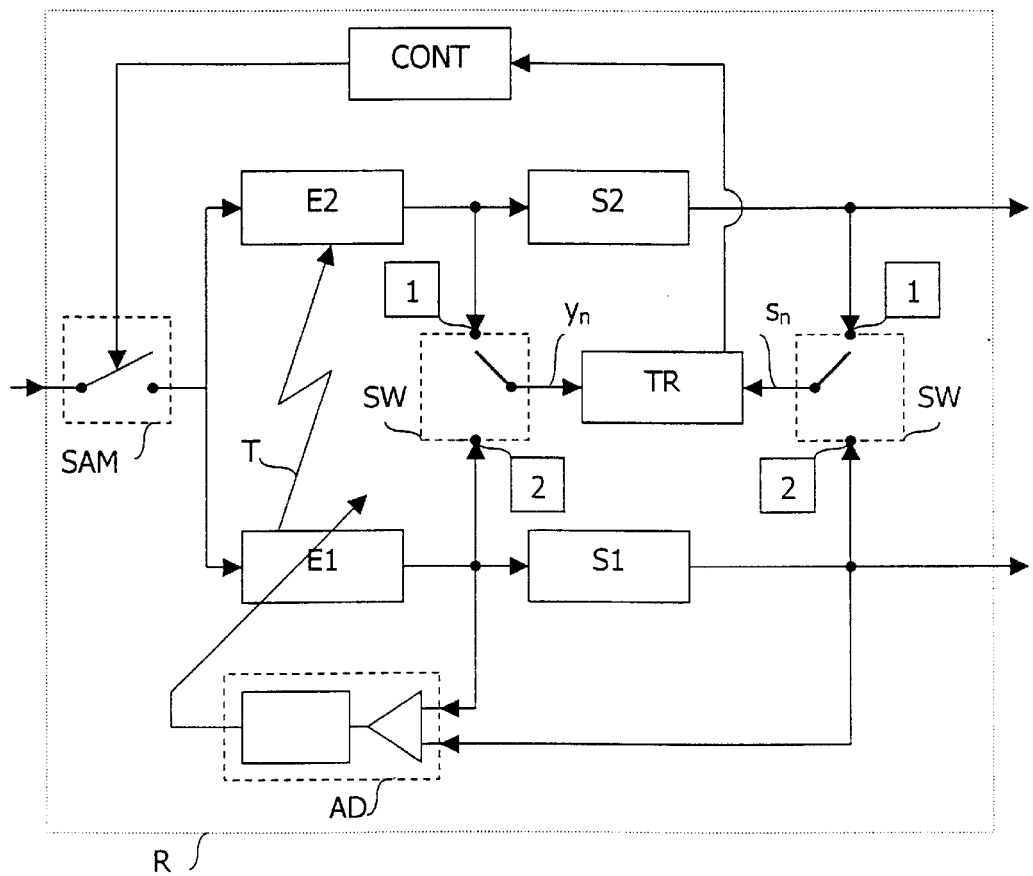
Figure 3:
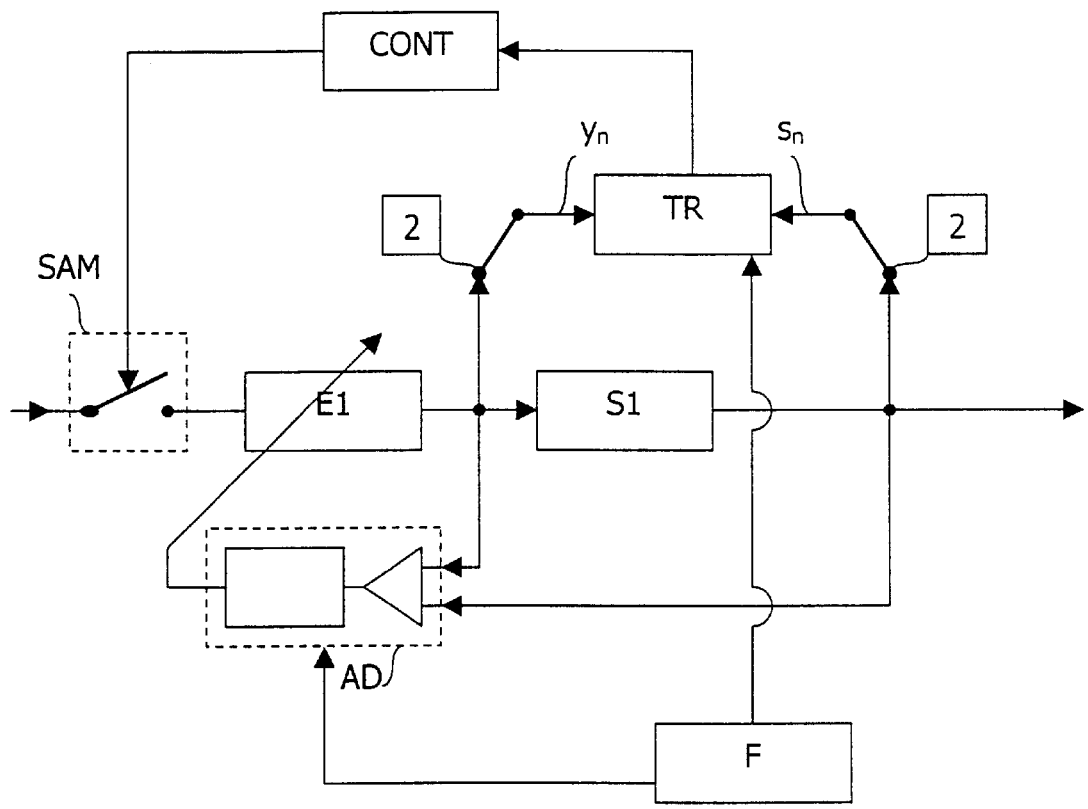
Figure 4:
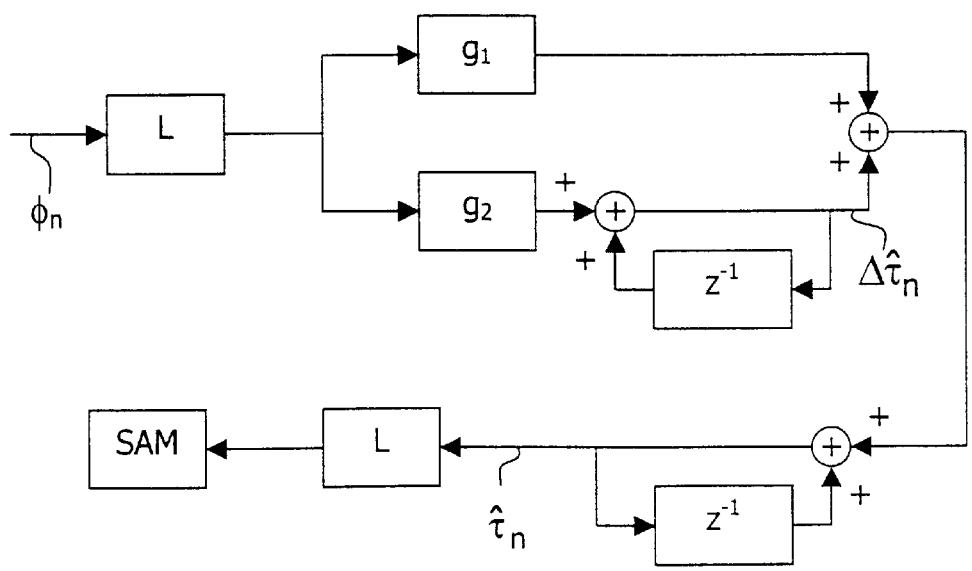

These as well as other more detailed aspects will become apparent from the following description of several embodiments of the invention, given by way of non-limitative example, with reference to the accompanying drawings, in which:

FIG. 1 represents the impulse response of the equalizer filter and the shift of the impulse response as a result of the simultaneous operation of the adaptive equalizer and the timing recovery device, FIG. 2 diagrammatically illustrates the general operation of a receiving system in accordance with the invention, FIG. 3 diagrammatically shows a receiving system in accordance with the invention in the second mode of operation, FIG. 4 diagrammatically illustrates the operation of a second-order phase-locked loop.

FIG. 2 diagrammatically illustrates the general operation of a receiving system (R) in accordance with the invention.

Such a system first of all includes a means (SAM) for sampling a demodulated signal at the sampling frequency of the receiving system.

The receiving system further includes a first (E1) and a second (E2) equalizer arranged to receive the sampled signal.

The receiving system also includes a first (S1) and a second (S2) threshold detector arranged to receive signals from the first (E1) and the second (E2) equalizer, respectively.

The first equalizer (E1) is an adaptive equalizer. In the preferred embodiment the equalizer filter is a digital bandpass filter having a finite impulse response, referred to as an FIR filter. In the present case the equalization is realized by means of an adaptation device (AD) which calculates the coefficients of the digital filter FIR as a function of the equalization error $e_n$ defined by: $e_n = y_n - s_n$ in accordance with a customary minimization method. The second equalizer (E2) is inherently a fixed equalizer which, for this reason, utilizes a filter whose coefficients are fixed.

The receiving system further comprises a timing recovery device (TR) of a transmitting system for the receiving system, which device is arranged to receive the equalized signals ($y_n$) from an equalizer and the output signals ($s_n$) from an associated threshold detector.

The timing recovery device is realized with the aid of a second-order phase-locked loop whose input is an estimate of the phase error calculated from the equalization error $e_n$. The output of the phase-locked loop is applied to a timing control device (CONT) of the receiving system, which enables the sampling (SAM) of the received signal to be advanced or delayed.

The receiving system finally includes a device (SW) for switching between a first mode of operation (position 1), in which the timing recovery device (TR) receives the signals ($y_n$ and $s_n$) from the second equalizer (E2) and the second threshold detector (S2), and a second mode of operation (position 2), in which the timing recovery device (TR) receives the signals ($y_n$ and $s_n$) from the first equalizer (E1) and the first threshold detector (S1).

In the preferred embodiment the first mode of operation corresponds to the communication initialization phase. Thus, it appears that during this phase the adaptive equalizer (E1) and the timing recovery device (TR) operate independently of one another, the timing recovery device then receiving the signals from the fixed equalizer (E2) and the second threshold detector (S2).

In the communication initialization phase the adaptation device (AD) associated with the adaptive equalizer calculates the coefficients of the adaptive filter, which are transferred (T), at appropriate time intervals, from the adaptive equalizer (E1) to the fixed equalizer (E2). In the preferred embodiment two to three coefficient transfers are effected. The coefficients of the fixed equalizer filter (E2) are first set to 0. The first transfer subsequently occurs after processing of a reference sequence comprising a given number of symbols (512 in the preferred embodiment), so as to enable a coarse convergence of the phase-locked loop. Subsequently, the following transfers are effected as a function of the value of a calculated signal-to-noise ratio at the output of the fixed equalizer (E2) and they provide a finer convergence of the process. Such a refreshing of the coefficients of the fixed equalizer filter (E2) enables the convergence of the timing recovery device to be improved.

In the preferred embodiment the second mode of operation corresponds to the data transmission phase. FIG. 3 diagrammatically shows the receiving system in accordance with the invention in this second mode of operation.

In said phase the switching device is in position 2. However, the adaptive equalizer (E1) and the timing recovery device (TR) do not operate simultaneously in the preferred embodiment. For this purpose, the receiving system in accordance with the invention has a means (F) for freezing the operation of one of the two devices for a given time interval, the other device operating normally. In the preferred embodiment the operation of each of the devices is frozen for half the time in that its gain is set to zero. This mode of operation thus enables 50% to be gained in terms of calculation time.

FIG. 4 illustrates in greater detail the operation of the second-order phase-locked loop of the timing recovery device.

In this preferred embodiment the phase shift $\tau$ between the transmitting system and the receiving system is estimated with the aid of a cost function $\phi$ which, in the preferred embodiment, is defined as follows:

$$\phi_n = \frac{|s_n|^2 - |y_n|^2}{Re\left(s_n \sum_{i=0}^{k-1} \frac{(-1)^{k-l+1}}{3(k-i)}(s_{n-k+i} - s_{n+k-i})\right)},$$

where: –n is a symbol number,
k corresponds to the number of symbol pairs taken into account in the equalization window (EW),
Re( ) represents the real part function.

Since the transmitted symbols are statistically independent, the expectance E of $\phi_n$ may be written as follows:

$$E[\phi_n] = -K\sigma^2 \tau_n$$

where: –K is a constant,
$\sigma^2$ is the variance of the signal.
The estimate of the phase shift $\hat{\tau}_n$ is then determined in accordance with the following process:

$$\Delta\hat{\tau}_n = \Delta\hat{\tau}_{n-1} + g_2\phi_n$$
$$\hat{\tau}_n = \hat{\tau}_{n-1} + \Delta\hat{\tau}_n + g_1\phi_n$$

were $g_1$ and $g_2$ are constants which define the progress of the process.

These equations correspond to a second-order phase-locked loop and take the form of the graph shown in FIG. 4, where $z^{-1}$ represents a delay of one symbol.

The transfer function which is equivalent to this second-order phase-locked loop is then written as follows in the Laplace domain:

$$\frac{\hat{\tau}_n(p)}{\tau_n(p)} = \frac{K\sigma^2 g_1 p + K\sigma^2 g_2}{p^2 + K\sigma^2 g_1 p + K\sigma^2 g_2}$$

This yields the expression for the oscillation frequency $\omega_o$ and the attenuation coefficient $\xi$ of the second-order loop:

$$\omega_0 = \sqrt{K\sigma^2 g_2},$$

$$\xi = \frac{\sigma\sqrt{K}}{2}\frac{g_1}{\sqrt{g_2}}.$$

The constants $g_1$ and $g_2$ are determined empirically so as to obtain a rapid convergence of the second-order loop.

By means of threshold blocks (L) discontinuous corrections can be applied to $\phi_n$ and $\hat{\tau}_n$ only when they exceed a certain threshold. This threshold is chosen so as to increase the stability of the system.

A receiving system (R) in accordance with the invention provides an independent operation of the adaptive equalizer (E1) and of the timing recovery device (TR), which precludes interference between these two devices. This provides an improvement of the equalization efficiency as well as of the convergence of the device (TR) which enables the timing to be recovered.

In accordance with the previously presented background information at the beginning of this patent document, the skilled artisan would recognize that the above-described receiving system may be implemented in any digital communication system, including, for example, a modem, a set-top box, and a television set.

What is claimed is:

1. A receiving system including a first equalizer associated with a first threshold detector and a device which enables the timing of a transmitting system to be recovered for said receiving system from an equalized signal and a signal obtained by thresholding, characterized in that said receiving system also includes a second equalizer, which is a fixed equalizer associated with a second threshold detector and a device by means of which it is possible to switch between a first mode of operation in which the equalized signal and the signal obtained by thresholding are to be supplied by the second equalizer and the second threshold detector, respectively, and a second mode of operation in which the said signals are to be supplied by the first equalizer and the first threshold detector, respectively.

2. A receiving system as claimed in claim 1, characterized in that the first equalizer is adapted to transfer, at appropriate time intervals, coefficients of an adaptive filter to the second equalizer, the said coefficients being calculated from an equalization error equal to a difference between the signals obtained from the first equalizer and the first threshold detector.

3. A receiving system as claimed in claim 1, characterized in that it comprises a means which enables the timing recovery device and the first equalizer to operate alternately during the second mode of operation.

4. A modem including a receiving system as claimed in claim 1.

5. A set-top box including a receiving system as claimed in claim 1.

6. A television set including a receiving system as claimed in claim 1.

7. A digital communication system including at least one transmitting system and at least one receiving system as claimed in claim 1, which systems communicate with one another via a channel.

8. The receiving system of claim 1, wherein the first mode of operation corresponds to the communication initialization phase and the second mode of operation corresponds to the data transmission phase.

9. A receiving system including a first equalizer associated with a first threshold detector and a device which enables the timing of a transmitting system to be recovered for said receiving system from an equalized signal and a signal obtained by thresholding, characterized in that said receiving system also includes a second equalizer, which is a fixed equalizer associated with a second threshold detector and a device by means of which it is possible to switch between a first mode of operation in which the equalized signal and the signal obtained by thresholding are to be supplied by the second equalizer and the second threshold detector, respectively, and a second mode of operation in which the said signals are to be supplied by the first equalizer and the first threshold detector, respectively and wherein the timing recovery device comprises a means by which it is possible to estimate a phase shift between the clocks of the transmitting system and the receiving system by controlling a function $\phi$ such that:

$$\phi_n = \frac{|s_n|^2 - |y_n|^2}{Re\left(s_n \sum_{i=0}^{k-1} \frac{(-1)^{k-l+1}}{3(k-i)}(s_{n-k+i} - s_{n+k-i})\right)},$$

where: −n is a symbol number, k specifies the number of symbol pairs take into account in an equalization window, Re( ) represents the real part function.

* * * * *